United States Patent Office

2,899,415
Patented Aug. 11, 1959

2,899,415

COORDINATION POLYMERIZATION CATALYSTS

William Lawrence Truett, Wilmington, Del., assignor to E. I. du Pont de Nemours and Company, Wilmington, Del., a corporation of Delaware No Drawing. Application September 13, 1954
Serial No. 455,769

3 Claims. (Cl. 260—94.9)

This invention relates to novel catalyst systems which are highly valuable for the production of solid ethylene polymers and the process using these novel catalysts in the polymerization of ethylene.

Heretofore, it has been widely known that ethylene can be converted to solid polymers under very high pressures in the presence of catalysts capable of yielding free radicals under polymerization conditions.

It has also been known heretofore (U.S. Patents 2,212,155, 2,475,520, 2,467,234) that certain metal alkyls and Grignard reagents are capable of initiating the conversion of ethylene to solid polymers through a free radical mechanism. Ethylene has also been converted to solid polymers in the presence of hydrogenation catalysts, particularly in the presence of alkali metals or alkali metal hydrides (British Patent 536,102).

Generally speaking, Friedel Crafts type catalysts have not been effective for converting ethylene to solid polymers from ethylene; however, it has recently been reported that solid polymers can be obtained by polymerizing ethylene in the presence of aluminum chloride and titanium tetrachloride at elevated temperatures and pressures advantageously in the presence of HCl-binding metals like aluminum powder (Fischer German Patent 874,215, ausgegeben April 20, 1953).

Still more recently it was disclosed (JACS, 75, 3879) that polymerization of styrene is possible in the presence of a phenyl magnesium halide-butyl titanate mixture. Attempts to polymerize ethylene to solid polymers in the presence of the same mixture of phenyl magnesium bromide and butyl titanate in the form in which it was disclosed, could not be used to make solid ethylene polymers at low pressures.

The theories which have been advanced to explain mechanisms of polymerization assume that the polymerization of olefins by the addition of catalytic reagents such as Grignards takes place by a free radical mechanism whereas polymerizations catalyzed by Friedel Crafts type of compounds such as AlCl$_3$ takes place by a cationic mechanism. It could therefore not be predicted that any combination of the two types of catalyst hereinabove mentioned would result in a compound of high catalytic reactivity, especially in view of the widely different processes used when employing said catalysts.

It has been discovered in accordance with this invention that extraordinary and highly useful effects are produced by combining aluminum in the form of the halide or alkoxide with metallorganic compounds such as Grignard reagents in the presence of organic compounds containing ethylenic unsaturation.

The catalytic activity obtained from the combination of aluminum compounds and a Grignard such as ethyl magnesium bromide appears to be due to the reaction of the two above said components to form catalytically active complex. These active complexes when brought into the presence of an ethylenically unsaturated compound, such as ethylene, form coordination complexes capable of polymerizing the ethylene to a solid polymer. The nature of these coordination complexes is not fully understood, partially because they are isolated only with extreme difficulty due to their instability. Their presence, however, can be determined from the chemical properties of the mixture produced when the aluminum compound is reacted with a Grignard in the presence of an ethylenically unsaturated compound. It is believed that on reaction of the aluminum compound with a Grignard reagent a partial alkylation takes place which changes the electron configuration around the aluminum in such a fashion as to produce an electron distribution in the aluminum atom favorable to complexing with olefins. This aluminum will then combine with the ethylene to form a coordination complex which in turn is able to propagate the polymerization of ethylene. It is believed that the coordination complexes hereinabove described are novel compounds which have not heretofore been employed in the polymerization of ethylene.

It is believed that the aluminum is transferred into an active state by a Grignard reagent because of the strong alkylating properties of the Grignard compound exhibited by the metal to hydrocarbon bond. It is therefore quite possible that other strong alkylating agents such as metal alkyls, and possibly also metal hydrides are able to change the aluminum into an active state which, on mixing with ethylene, will form the coordination complex described hereinabove. It is also possible that the products of the alkylation reaction influence the activity of the catalyst by coordinating with the alkylated aluminum compound.

The activity of the catalyst depends in part upon the nature of the group originally attached to the aluminum. It is quite possible that this effect depends on the varying degrees of shielding around the cation, i.e., the shielding power of the group attached to the aluminum influences the activity of the catalyst by influencing the tendency of the aluminum to coordinate. Thus, it is preferred to use aluminum chlorides and aluminum alkoxy compounds which do not interfere in the formation of the active complex.

The polymerization of ethylene to produce solid polymers in the presence of the catalysts herein disclosed is preferably and economically carried out at elevated temperatures and moderately high pressures within a range of 10 to 500 atmospheres. The temperatures employed in the process of this invention are within the range of about 0 to 300° C. and preferably within the range of 150 to 250° C. The polymerization of ethylene, according to the process of this invention, takes place most satisfactorily when the polymerization mixture is substantially moisture-free and also free of hydroxyl groups. As in numerous other ethylene polymerization processes, the process of this invention should be kept free of oxygen or at least the oxygen content should be below 20 parts per million.

In specific embodiments, the polymerization mixtures, especially those employing inert solvents, such as hydrocarbons, are homogeneous and contain the active coordination complex in a dissolved form. These homogeneous catalyst systems have certain advantages over heterogeneous catalyst systems. In the homogeneous system, the polymerization takes place very readily in the presence of a relatively small amount of the coordination complex. In contrast with this, if a heterogeneous system is employed, polymerization of ethylene to give solid polymers is attained only with great difficulty and in small quantities, indicating the importance of surface area for the catalyst to cause polymerization of ethylene to solid polyethylene.

The activity of the catalysts, hereinabove described, is not merely the additive activities of the components, but differs quantitatively and qualitatively from the additive activities of the said components. Thus the aluminum halides, being Friedel Crafts type of catalysts, will result in liquid polymers of ethylene, whereas the polymers obtained by the process of this invention are solid and tough polymers. The use of organomagnesium-halides in themselves as free radical catalysts for the polymerization of ethylene, require extremely high presure, not used in the process of this invention, to polymerize ethylene to a solid polymer.

The invention is illustrated further by means of the following examples:

*Example 1.*—A solution of 0.03 mole of $AlCl_3$ and 200 ml. of cyclohexane was heated to 50 to 55° C. and 0.03 mole of an ethereal solution of ethyl magnesium bromide was added rapidly under a blanket of nitrogen. The mixture was shaken for several minutes and was introduced into a 325 ml. shaker tube. After flushing with nitrogen and evacuating, the tube was pressured up to 2500 p.s.i. with ethylene and the mixture was shaken at 200° C. for 90 minutes. The resulting product was washed in a Waring Blendor with successive portions of acetone, methanol, hydrochloric acid in methanol and acetone, and dried overnight in a 70° C. oven, yielding 1.4 grams of polyethylene, which was found to have a density of 0.945 and could be compression molded into tough films.

*Example 2.*—Into a 325 ml. shaker tube was placed 0.02 mole of aluminum ethoxide $(Al(OEt)_3)$; 0.03 mole of ethyl magnesium bromide dissolved in diethyl ether was then added under a blanket of nitrogen. The shaker tube was evacuated, and flushed with notrogen and again evacuated. The tube was then heated and pressured with ethylene until the temperature had reached 200° C. and the presure had built up to 2500 p.s.i. Upon shaking the tube for 90 minutes the contents of the tube were removed. The polymer was separated from the mixture by filtering and then washed with methanol, methanol hydrochloric acid mixture and methanol. The dry polymer was found to be solid and could be compression molded into a tough film more rigid than commercial polyethylene.

The polymers obtained by the process of this invention are high density solid tough polymers and are thereby distinguished from polymers made by using the components of this novel catalyst system individually, which are either low density polymers or liquid polymers.

The quantity of catalyst employed can be varied over a rather wide range, but it is desirable to employ a quantity of catalysts which is at least large enough to produce a reasonably rapid rate for a reasonably long period of time. In general, the quantity is within the range of 0.1 to 10% based on the weight of Al per unit weight of monomer.

The polymers which are made under the conditions hereinabove described frequently have such high molecular weights that removal of catalyst by dissolving and filtering is extremely difficult. The best procedure for obtaining the polymer in a clean form is to wash with acetone hydrochloric acid mixture in a Waring Blendor followed by washing with acetone or methanol thereafter, if necessary, followed by acetone aqueous sodium hydroxide washes and finally by acetone- or methanol-water wash. The products thus obtained are generally white. While this procedure is highly satisfactory for preparing clean polymer, it is to be understood that simpler procedures, such as treatment with steam, will be suitable for various practical applications. Other washing procedures will be apparent to those skilled in the art.

The structure of the polyethylene made in accordance with the process of this invention evidently is characterized by being a straight chain hydrocarbon, with vinyl groups at one or both ends of at least some of the molecules. The infrared measurements indicate very little methyl substitution and a very small number of vinylidene groups with little or no transunsaturation or carbonyl groups.

The catalytic activity of the catalysts described herein is of such a nature as to be well suited for the polymerization of other ethylenically unsaturated compounds such as propylene, butadiene, styrene, etc.

The products obtained by polymerizing ethylene with catalysts hereinabove disclosed are solid polymers exclusively and are not contaminated with Friedel Crafts type of oily polymers. The ethylene polymers obtained in accordance with this invention are valuable in many applications, especially in the form of films, molded articles, extruded insulation on wire, etc.

I claim:

1. The process of polymerizing ethylene to form solid polymers which comprises contacting ethylene at a temperature of 0 to 300° C. in the presence of an inert organic solvent with a catalyst formed by admixing an aluminum compound of the class consisting of aluminum chloride and aluminum ethoxide with ethyl magnesium bromide, the molar ratio of the magnesium compound to the aluminum compound being at least one.

2. The process as set forth in claim 1 wherein the aluminum compound is aluminum chloride.

3. The process as set forth in claim 1 wherein the aluminum compound is aluminum ethoxide.

References Cited in the file of this patent

UNITED STATES PATENTS

| | | |
|---|---|---|
| 2,058,373 | Weissenborn | Oct. 20, 1936 |
| 2,406,869 | Upham | Sept. 3, 1946 |
| 2,721,189 | Anderson et al. | Oct. 18, 1955 |

FOREIGN PATENTS

| | | |
|---|---|---|
| 874,215 | Germany | Apr. 20, 1953 |